United States Patent
Janssens et al.

(10) Patent No.: US 6,455,800 B1
(45) Date of Patent: Sep. 24, 2002

(54) SERVO-PNEUMATIC MODULAR WELD GUN

(75) Inventors: William E. Janssens, Canton, MI (US); Thomas J. Cusumano, Birmingham, MI (US); Tarek El-Sawaf, Douglaston, NY (US); Michael Zona, Melville, NY (US); Louis Ariosto, Howard Beach, NY (US)

(73) Assignee: Festo Corporation, Hauppauge, NY (US)

( * ) Notice: Subject to any disclaimer, the term of this patent is extended or adjusted under 35 U.S.C. 154(b) by 9 days.

(21) Appl. No.: 09/754,481

(22) Filed: Jan. 4, 2001

(51) Int. Cl.[7] ............................. B23K 9/12; B23K 11/00
(52) U.S. Cl. .................................... 219/86.41; 219/91.2
(58) Field of Search .............................. 219/86.41, 91.2, 219/86.1

(56) References Cited

U.S. PATENT DOCUMENTS

| | | | |
|---|---|---|---|
| 2,041,913 A | | 5/1936 | Fassler |
| 4,403,281 A | * | 9/1983 | Holmes et al. |
| 4,447,697 A | * | 5/1984 | Dunne et al. |
| 4,656,457 A | | 4/1987 | Brausfeld et al. |
| 4,724,294 A | * | 2/1988 | Klein |
| 4,912,294 A | * | 3/1990 | Tsujii |
| 5,150,049 A | | 9/1992 | Schuetz |
| 5,239,155 A | | 8/1993 | Olsson |
| 5,393,950 A | * | 2/1995 | Killian |
| 5,405,075 A | * | 4/1995 | Narita et al. |
| 5,412,172 A | * | 5/1995 | Ichikawa et al. |
| 5,477,771 A | | 12/1995 | Black |
| 5,582,747 A | * | 12/1996 | Sakai et al. |
| 5,906,755 A | * | 5/1999 | Arasuna et al. |
| 6,043,449 A | * | 3/2000 | Kanjo |
| 6,064,028 A | * | 5/2000 | Schmid-Doernte |
| 6,225,590 B1 | * | 5/2001 | Farrow |
| 6,313,427 B1 | * | 11/2001 | Suita |

OTHER PUBLICATIONS

US 2001/0045413 A1 Suita (11-19-01).*

* cited by examiner

*Primary Examiner*—Tom Dunn
*Assistant Examiner*—Kiley Stoner
(74) *Attorney, Agent, or Firm*—Hoffman & Baron, LLP

(57) ABSTRACT

A fully programmable servo-pneumatic modular weld gun having closed-loop position and pressure control generally includes a weld gun base module, a pneumatic cylinder with a movable piston having a first welding electrode, a J-shaped gun arm having a first end attached to the base module and a second end having a second welding electrode and a controller for providing closed-loop positioning and pressure control of the first welding electrode. The pneumatic cylinder includes an internal positioning encoder for detecting piston position and transmitting piston position information to the controller to control movement of the piston through a proportional flow control valve and a proportional pressure regulator. In a method for controlling the position of a spot weld gun weld tip, one of a plurality of binary bit position sequences corresponding to a different weld tip position are inputted to a controller that compares the inputted sequence to the actual position of the weld tip as detected by an internal positioning encoder. Based on the comparison, the controller activates a control valve of a pneumatic cylinder to extend or retract the weld tip. By manipulating the bit sequences and depending on the input address of the controller, other welding parameters such as weld pressure, equalizer pressure and tip dampening can be controlled.

18 Claims, 2 Drawing Sheets

SERVO-PNEUMATIC MODULAR WELD GUN

FIELD OF THE INVENTION

The present invention generally relates to spot welding guns and more particularly to a servo-pneumatic modular weld gun system having freely programmable closed loop position and pressure control. The present invention is well suited to rapid assembly line welding applications, particularly in the automotive industry.

BACKGROUND OF THE INVENTION

Resistance or spot welding joins middle sheets or structures through heat produced by resistance to the flow of electrical current. The metal structures to be welded are typically clamped together with rod shaped electrodes applying pressure on opposite sides. An electric current passing between the electrodes meets resistance when it flows across the metal structures producing heat that melts the metal and welds them together.

Conventional spot welding guns utilize one or more pneumatic cylinders to extend and retract a moveable electrode and to apply the pinching force to the materials to be welded. The pneumatic cylinder moves the electrode weld tip to one of at least three known positions. These hard stop positions include fully retracted, fully extended and a mid-point position. After welding with the weld tip in its fully extended position, the piston rod returns to a mid-point position rather than its fully retracted position. This reduces cycle time between welds. To accomplish this design parameter, normally a three position pneumatic cylinder having a fixed mid-point position is used in the spot weld gun.

Typically, the specific weld application dictates the design of the weld gun configuration. In other words, weld guns are usually custom made to fit the particular welding application. Several considerations must be addressed in custom designing a weld gun. Design parameters include the gap between the electrode weld tips, the stroke of the movable electrode, the hard positions of the electrode weld tip and the cycle time. Thus, depending upon the weld application, a custom weld gun is designed around a selected three position pneumatic cylinder. Accordingly, in an assembly line environment there may be several different weld gun configurations in operation at any one time. The obvious disadvantage of custom designed weld guns is the total lack of standardization and interchangeability.

Additionally, when a weld parameter changes in a conventional weld gun system, usually the weld gun must be disassembled and redesigned for the new welding parameter. For example, if it is desired to change the weld tip mid-point position, a new pneumatic cylinder must be substituted for the existing cylinder. During this retrofit, the weld gun must be taken out of the assembly line resulting in production down time. Attempts to avoid this disadvantage include providing weld guns having multiple pneumatic cylinders. However, the disadvantage of multiple cylinder weld guns is the increase in weight and complexity.

Accordingly, it would be desirable to provide a weld gun configuration having a standard design that can be readily interchanged with other weld guns. It is also desirable to provide a weld gun that is freely programmable to provide for any desired weld tip positioning and/or pressure.

SUMMARY OF THE INVENTION

The present invention is a fully programmable servo-pneumatic modular spot weld gun having closed-loop position and pressure control and a method for controlling the position of a weld gun welding electrode. The weld gun generally includes a weld gun base module, a pneumatic cylinder with a movable piston having a first welding electrode, a J-shaped gun arm having a first end attached to the base module and a second end having a second welding electrode and a controller for providing closed-loop positioning and pressure control of the first welding electrode.

The pneumatic cylinder includes an internal positioning encoder for detecting piston position and transmitting piston position information to the controller to control movement of the piston through a proportional flow control valve and a proportional pressure regulator. Preferably, the internal positioning encoder is a linear potentiometer fitted within the piston rod of the pneumatic cylinder to accurately determine the extension and retraction of the piston rod.

The closed-loop positioning control allows for use of a standard pneumatic cylinder having a known stroke and cylinder bore. Thus, the weld gun is adapted for releasable attachment of the pneumatic cylinder and the gun arm, whereby the pneumatic cylinder and the gun arm may be interchanged with other pneumatic cylinders and gun arms. Additionally, the weld gun base module components are made from high strength machined aluminum to reduce weight.

In a method for controlling the position of a spot weld gun weld tip, one of a plurality of binary bit position sequences corresponding to a different weld tip position are inputted to a controller that compares the inputted sequence to the actual position of the weld tip as detected by an internal positioning encoder. Based on the comparison, the controller activates a control valve of a pneumatic cylinder to extend or retract the weld tip. Preferably the bit sequence comprises four binary bits representing sixteen possible weld tip locations.

By manipulating the bit sequences and depending on the input address of the controller, other welding parameters such as weld pressure, equalizer pressure and tip dampening can be controlled. For example, a method of controlling weld pressure at the weld tip includes the steps of inputting one of a plurality of binary bit pressure sequences to a controller wherein each pressure sequence corresponds to a different pressure applied at the weld tip. The pressure sequence is compared with the actual weld tip pressure detected by a pressure regulator and, based on the comparison, the controller activates the control valve of the pneumatic cylinder to increase or decrease pressure applied at the weld tip. Similarly multiple weld tip positions may be programmed into the controller to provide a tip dampening feature to the weld gun.

For a better understanding of the present invention, reference is made to the following detailed description to be read in conjunction with the accompanying drawings and its scope will be defined in the appended claims.

DETAILED DESCRIPTION OF THE PREFERRED EMBODIMENTS

Figure 1:
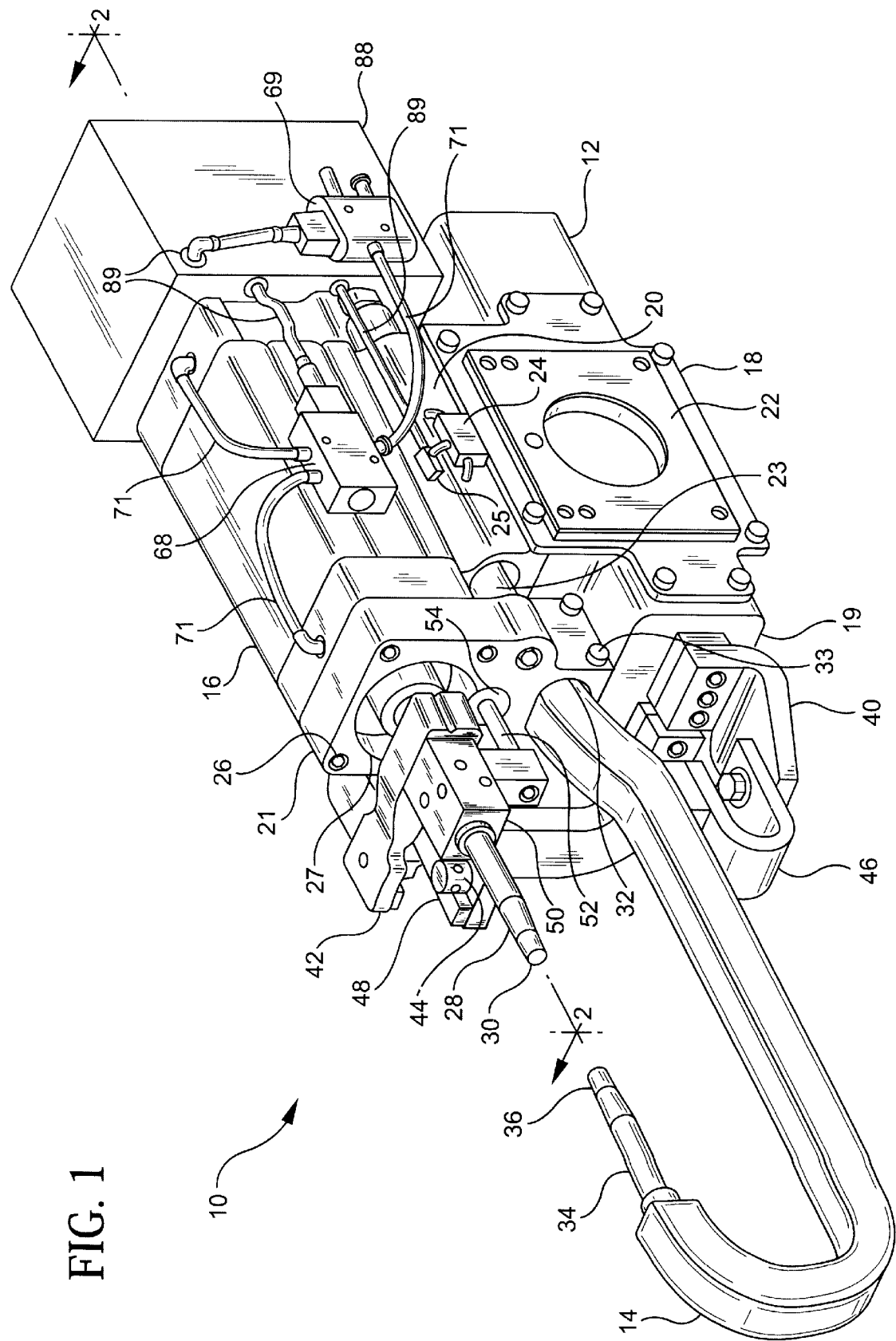
FIG. 1 is a top perspective view of the servo-pneumatic weld gun formed in accordance with the present invention.

Referring to FIG. 1, a servo-pneumatic modular weld gun 10 formed in accordance with the present invention is shown. The weld gun 10 generally includes a weld gun base module 12, a J-shaped gun arm 14, a pneumatic cylinder 16 and a sub-controller 88.

The weld gun base module 12 is constructed to act as a platform for a multitude of designs. In other words, the base module 12 remains the same regardless of the type of pneumatic cylinder or gun arm used. By interchanging stationary gun arms, a wide variety of weld conditions can be satisfied, while keeping the total number of weld gun components to a minimum. Reduction in the number of weld gun components benefits the end customer by reducing both spare weld gun requirements and spare part inventories. Maintenance costs and training are also minimized due to the base module commonality.

The base module 12 comprises a base 18, a weld transformer 19, an equalizer assembly 20, a weld gun base flange 21 and mounting brackets 22. The base 18, the base flange 21 and the mounting brackets 22 are machined from high strength, aircraft quality aluminum, thereby reducing the overall weight of the base module 12 but still providing the required strength. The mounting brackets 22 are provided on two sides and the bottom of the base 18 to enable attachment of the weld gun 10 to a robotic arm or other assembly line welding machine in any one of three configurations. All parts are machined from billet material reducing weight and eliminating the need for casting patterns and thereby reducing manufacturing time.

The transformer 19, the equalizer assembly 20 and the mounting brackets 22 are connected to the base 18 by bolts. The weld transformer 19 includes electrical connectors (not shown) for connection to an external power source and provides the required current to the weld gun. The open design of the base module 12 allows for a variety of weld transformers including U.S. standard AC and DC styles as well as ISO standard styles.

The equalizer assembly 20 is a conventional pneumatic cylinder having a piston rod 23 extending outwardly therefrom. Secured to the end of the piston rod 23 is the weld gun base flange 21. Thus, the base flange 21 moves together with the piston rod 23 of the equalizer assembly 20. The equalizer assembly 20 includes a proportional control valve 24 and a pressure regulator 25 for controlling and monitoring air pressure supplied to the pneumatic cylinder for extending and retracting the equalizer piston rod 23. Operation of the equalizer assembly 20 will be discussed in further detail below.

Also connected to the base module 12 are a transformer bus bar 40, a movable bus bar 42, electrode adapters 44, a stationary shunt 46 and a movable shunt 48 for providing electrical connections from the weld transformer 19. The movable bus bar 42 and the movable shunt 48 are connected to a movable shank portion 28 of the pneumatic cylinder 16 by an arm 50 which includes a guide shaft 52 that is journaled into a bearing 54 fixed in the base flange 21. The guide shaft 52 and the bearing 54 help to ensure proper alignment of the movable shank portion 28 of the cylinder piston during travel.

Not shown on the base module 12 are conventional water line connections and associated internal water passages and manifolds for cooling the components of the weld gun. Any suitable cooling system design may be utilized with the weld gun of the present invention. Such systems are well known in the art and need not be discussed in any further detail.

The base flange 21 further includes a gun arm receiving cavity 32 for attachment of the gun arm 14. The gun arm 14 is also made from a machined high strength aircraft quality aluminum to reduce weight. The gun arm 14 is generally J-shaped, having one end secured to the base flange 21 and a stationary shank 34 with a weld tip 36 secured at an opposite end thereof. The gun arm 14 is secured to the base flange 21 by bolts 33 such that the stationary shank portion 34 of the gun arm is axially aligned with the movable shank portion 28 of the cylinder piston and a gap is formed between the opposing weld tips of the shanks. Thus, when the equalizer assembly 20 is activated, the stationary shank portion 34 of the gun arm 14 moves together with the equalizer piston rod 23 toward or away from the movable shank portion 28 of the cylinder piston. By interchanging different gun arms, the gap between the weld tips can be adjusted. Again, the gun arm 14 and the pneumatic cylinder 16 are releasably connected to the base flange 21 to provide for full interchangeability.

Connected to the base flange 21 by bolts 26 is the pneumatic cylinder 16. The base flange 21 is formed with a bore 27 through which the cylinder piston rod extends. Connected to the cylinder piston rod is a movable shank portion 28 having a weld tip 30 at its external end.

An important benefit of the present invention is the provision for the use of a standard ISO 6431 multi-position pneumatic cylinder. A suitable pneumatic cylinder for use with the weld gun of the present invention is Model No. DNC-125-200 manufactured by Festo Corporation of Hauppauge, N.Y. As discussed above, conventional weld guns are usually custom made using a 3-position cylinder. When a new application is required, the weld gun must be disassembled and reconfigured for the new application. Thus, there is virtually no interchangeability with existing weld guns. By standardizing the pneumatic cylinder, the end user can have several identical weld guns on hand that can be easily interchanged. This dramatically reduces down time when tooling applications change. As discussed in further detail below, standardization is achieved by incorporating an internal positioning encoder 78 into a standard cylinder and providing a sub-controller 88 to provide continuous closed-loop positioning control.

Continuous closed-loop positioning control means that the actual position of the weld tip 30 is continuously monitored by the internal positioning encoder 78 and this information is sent to the sub-controller 88 where it is compared with input information corresponding to a desired weld tip position. The position of the weld tip 30 is then automatically adjusted by the sub-controller 88 based on the comparison of the actual position and the input information.

Figure 2:
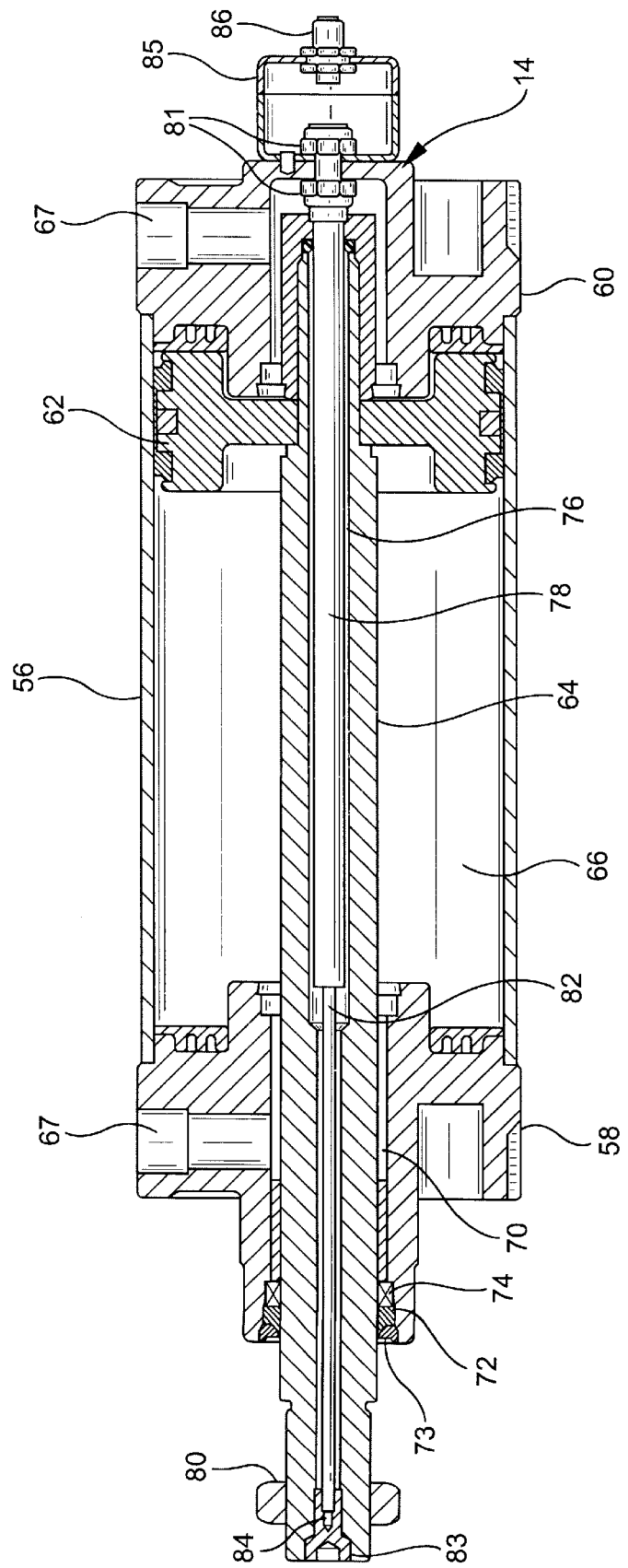
FIG. 2 is a cross-sectional view of the pneumatic cylinder taken along the line 2—2 of FIG. 1.

FIG. 2 illustrates a cross-section of the pneumatic cylinder 16 taken along the line 2—2 in FIG. 1. The pneumatic cylinder 14 generally includes a cylindrical housing 56, bearing caps 58 and 60, a piston 62 and a piston rod 64. The bearing caps 58 and 60 are fixed to the ends of the cylindrical housing 56 to thereby form a piston chamber 66 therein. The bearing caps 58 and 60 include ports 67 for connection to a compressed air source through a proportional control valve 68 and a proportional pressure regulator 69 shown in FIG. 1. The proportional pressure regulator 69 monitors and controls compressed air going to the proportional control valve 68 through pneumatic lines 71 as will be discussed in further detail below. The front bearing cap 58 further includes a central bore 70 through which the piston rod 64 may travel. The piston 62 is fixed to the piston rod 64 forming an air-tight seal against the interior of the cylinder housing 56 such that when compressed air is applied to one of the ports 67 of one of the bearing caps, the piston moves in a direction away from the applied pressure, thereby moving the piston rod 64 in an axial direction. The standard bore for the internal chamber 66 is 125 mm bore and the stroke of the piston rod 64 is 185 mm.

Fixed within the central bore 70 of the front bearing cap 58 is a metallic scraper ring 72 which is held in place between a snap ring 73 and a bearing 74. The scraper ring 72 has an internal diameter sized so that the scraper ring is in intimate contact with the circumferential periphery of the piston rod 64. Thus, as the piston rod 64 moves, the scraper ring removes any weld slag that may accumulate on the piston rod thereby preventing such debris from entering the internal chamber 66 of the pneumatic cylinder 14.

The pneumatic cylinder 14 is retrofitted with a hardened C45 chrome plated piston rod 64 that has been gun drilled along its centerline to form an axial bore 76 therein. The axial bore 76 is sized to receive the internal positioning encoder 78. The piston rod 64 further includes a lock ring 80 fixed to its outer end to facilitate attachment of the movable arm 50, movable shank portion 28 and weld tip 30 thereto.

The internal positioning encoder 78 is preferably a linear potentiometer fixed at one end to the rear bearing cap 60 with stainless steel nylon lock nuts 81. The linear potentiometer 78 further includes a probe 82 fixed to the outer end of the piston rod 64. A suitable linear potentiometer for use with the weld gun of the present invention is Part No. 04LF8258 manufactured by Betatronix Inc. of Hauppauge, N.Y. FIG. 2 shows one method of attaching the piston probe 82 to the piston rod 64. A screw 83 having an internal axial thread 84 is threaded into the end face of the outer end of the piston rod 64. The probe 82 is then threaded into the internal thread of the screw thereby fixing the probe to the piston rod. The potentiometer 78 has a working stroke of 10 inches (254 mm) of which only 7.28 inches (185 mm) will be used. When the piston rod 64 is fully retracted, the potentiometer has a dead band of 1.35 inches (34 mm), same as when it is fully extended. The linear potentiometer 78 operates in a known manner whereby the extension of the probe 82 can be accurately measured. Consequently, the position and travel of the piston rod 64 can be accurately monitored.

An electrical enclosure box 85 is connected to the rear bearing cap 60 to house the potentiometer wiring. The electrical enclosure box 85 further includes electrical connectors 86 to facilitate electrical connection between the linear potentiometer 78 and a sub-controller 88. The sub-controller 88 is the interface between the weld gun 10 and a master controller (not shown). The sub-controller 88 is essentially a micro-processor that receives signals from the encoder 78, the proportional pressure regulator 69 and the equalizer pressure regulator 25 and compares these signals with signals received from the master controller. The proportional control valve 68, the proportional pressure regulator 69, the equalizer control valve 24 and the equalizer pressure regulator 25 are all electrically connected to the sub-controller 88 through lines 89.

The weld gun 10 generally operates in the following manner. With the weld tips 30 and 36 in a full open position, a robotic arm positions the weld gun so that the metal workpiece is between the weld tips. The equalizer assembly 20 is activated to retract the equalizer piston rod 23 and move the weld tip 36 toward the workpiece until it makes contact. This supports the workpiece during welding and prevents damage to the pneumatic cylinder 16. Once the workpiece is supported, the pneumatic cylinder 16 is activated to move the weld tip 30 toward the workpiece. Once the weld tip 30 contacts the workpiece, the transformer 19 provides a desired current between the weld tips 30 and 36. The current passes through the metallic workpiece melting the metal and producing a weld. When the weld is complete, the pneumatic cylinder 16 retracts the weld tip 30 to a mid-point position and the workpiece and/or gun is moved to a new location and the cycle repeats.

As mentioned above, by retracting the weld tip 30 to a mid-point position rather than a fully retracted position, cycle time between welds is greatly reduced. By incorporating an internal positioning encoder 78 and a sub-controller 88, the present invention allows for programming of any desired mid-point position through the master controller. Additionally, other features such as tip wear compensation, tip dampening and accurate calibration are achieved as discussed in further detail below.

The master controller coordinates all motion, pressure control and sequencing for the weld gun robotic arm based on its own internal program and on feedback from the sub-controller 88. This is accomplished by the transmission of bit sequences between the master controller and the sub-controller 88. The master controller and the sub-controller communicate with each other through a standard communication protocol known as DeviceNet. The following table is a bit map showing the inputs of the master controller from the sub-controller and the outputs of the master controller to the sub-controller.

TABLE 1

| Bit Map | |
|---|---|
| Inputs | |
| Nxx:i01- | System On/System Ok |
| Nxx:i02- | Position Achieved |
| Nxx:i03- | Positioned for weld (stack-up is ok) |
| Nxx:i04- | Position Over Travel (pulled cap) |
| Nxx:i05- | Equalizer Pressure Achieved |
| Nxx:i06- | Weld Pressure Achieved |
| Nxx:i07- | System Calibrated |
| Outputs | |
| Nxx:o01- | Gun tip close strobe |
| Nxx:o02- | Calibrate weld tip |
| Nxx:o03- | Gun forward/backup strobe |
| Nxx:o04- | Forward/backup position Bit 1 |
| Nxx:o05- | Forward/backup position Bit 2 |
| Nxx:o06- | Forward/backup position Bit 3 |
| Nxx:o07- | Forward/backup position Bit 4 |
| Nxx:o08- | Tip close and weld position Bit 1 |
| Nxx:o09- | Tip close and weld position Bit 2 |
| Nxx:o10- | Tip close and weld position Bit 3 |
| Nxx:o11- | Tip close and weld position Bit 4 |
| Nxx:o12- | Start |
| Nxx:o13- | Weld pressure Bit 1 |
| Nxx:o14- | Weld pressure Bit 2 |
| Nxx:o15- | Weld pressure Bit 3 |
| Nxx:o16- | Weld pressure Bit 4 |
| Nxx:o17- | Jog Tip (+) |
| Nxx:o18- | Jog Tip (−) |
| Nxx:o19- | Equalizer pressure Bit 1 |
| Nxx:o20- | Equalizer pressure Bit 2 |
| Nxx:o21- | Equalizer pressure Bit 3 |
| Nxx:o22- | Equalizer pressure Bit 4 |

The master controller controls the weld gun by manipulating a sequence of binary bits. Bits 1–4 are manipulated to establish various operating parameters depending on the output address of the master controller. Bit 5 is a strobe bit carrying the execute command.

An "on" bit from master controller output Nxx:o12 turns the weld gun system on. Master controller outputs Nxx:o04–07 control the mid-point position of the pnumatic cylinder piston rod 64 based on feedback from the internal encoder 78. The piston rod 64 has a possible stroke of 150 mm for positioning purposes. The forward/backup position addresses, Nxx:o04–07 represent 0 mm–150 mm in 10 millimeter increments according to the following bit sequence shown in Table 2.

TABLE 2

Forward/Retract Position Table

| Bit 1 Nxx:o04 | Bit 2 Nxx:o05 | Bit 3 Nxx:o06 | Bit 4 Nxx:o07 | Stroke Position |
|---|---|---|---|---|
| 0 | 0 | 0 | 0 | 0 mm closed |
| 0 | 0 | 0 | 1 | 10 mm |
| 0 | 0 | 1 | 0 | 20 mm |
| 0 | 0 | 1 | 1 | 30 mm |
| 0 | 1 | 0 | 0 | 40 mm |
| 0 | 1 | 0 | 1 | 50 mm |
| 0 | 1 | 1 | 0 | 60 mm |
| 0 | 1 | 1 | 1 | 70 mm |
| 1 | 0 | 0 | 0 | 80 mm |
| 1 | 0 | 0 | 1 | 90 mm |
| 1 | 0 | 1 | 0 | 100 mm |
| 1 | 0 | 1 | 1 | 110 mm |
| 1 | 1 | 0 | 0 | 120 mm |
| 1 | 1 | 0 | 1 | 130 mm |
| 1 | 1 | 1 | 0 | 140 mm |
| 1 | 1 | 1 | 1 | 150 mm |

Output Nxx:o03 "on" will position the piston rod 64 to a location as determined by the bit sequence of Nxx:o04–07 and relative to the last operation of the calibrate output Nxx:o02. Again, this cannot be achieved without positive closed-loop feedback from the internal positioning encoder 78 sending signals back to the subcontroller 88 for comparison with the outputs from the master controller.

Master controller outputs Nxx:o08–11 also utilize a four bit sequence to close the weld gun to a desired gap between weld tips 30 and 36. This bit sequence allows for automatic calibration and for a tip dampening feature. By manipulating this bit sequence the weld tips can be positioned to an initial gap prior to welding at a "tip closed" position, according to the following bit sequence shown in Table 3.

TABLE 3

Tip Close and Weld Position Table

| Bit 1 Nxx:o08 | Bit 2 Nxx:o09 | Bit 3 Nxx:o10 | Bit 4 Nxx:o11 | Stroke Position |
|---|---|---|---|---|
| 0 | 0 | 0 | 0 | 0 mm |
| 0 | 0 | 0 | 1 | 1 mm |
| 0 | 0 | 1 | 1 | 2 mm |
| 0 | 0 | 1 | 1 | 3 mm |
| 0 | 1 | 0 | 0 | 4 mm |
| 0 | 1 | 0 | 1 | 5 mm |
| 0 | 1 | 1 | 0 | 6 mm |
| 0 | 1 | 1 | 1 | 7 mm |
| 1 | 0 | 0 | 0 | 8 mm |
| 1 | 0 | 0 | 1 | 9 mm |
| 1 | 0 | 1 | 0 | 10 mm |
| 1 | 0 | 1 | 1 | 11 mm |
| 1 | 1 | 0 | 0 | 12 mm |
| 1 | 1 | 0 | 1 | 13 mm |
| 1 | 1 | 1 | 0 | 14 mm |
| 1 | 1 | 1 | 1 | 15 mm |

The positions listed in Table 3 are relative to the location of the "tip closed" position and must be calibrated prior to operation. The weld tip has a relative stroke of 15 mm for welding purposes wherein the tip closed position bits Nxx:o08–11 represent 0 mm–15 mm in 1 mm increments. Output Nxx:o01 "on" will position the weld tip to a location that is determined by the bit sequence of Nxx:o08–11 and relative to the last operation of the calibrate bit Nxx:o02.

A third four bit sequence four bit sequence corresponding to outputs Nxx:o13–16 is used to manipulate welding pressure applied is used to manipulate welding pressure applied at the weld tips 30 and 36 and a fourth four bit sequence corresponding to outputs Nxx:o19–22 is used to manipulate equalizer pressure. The weld tip pressure has a range of 90 psi with a 6 psi per bit resolution that is set by sequencing the bits corresponding to outputs Nxx:o13–16. The equalizer assembly pressure also has a range of 90 psi with 6 psi per bit resolution that is set by sequencing the bits from master controller outputs Nxx:o19–22. Table 4 shows the bit sequence for setting both weld tip pressure and equalizer pressure.

TABLE 4

Weld and Equalizer Pressure Value Table

| Bit 1 Nxx:o13 Nxx:o19 | Bit 2 Nxx:o14 Nxx:o20 | Bit 3 Nxx:o15 Nxx:o21 | Bit 4 Nxx:o16 Nxx:o22 | Pressure Weld Equalizer |
|---|---|---|---|---|
| 0 | 0 | 0 | 0 | 0 psi |
| 0 | 0 | 0 | 1 | 6 psi |
| 0 | 0 | 1 | 0 | 12 psi |
| 0 | 0 | 1 | 1 | 18 psi |
| 0 | 1 | 0 | 0 | 24 psi |
| 0 | 1 | 0 | 1 | 30 psi |
| 0 | 1 | 1 | 0 | 36 psi |
| 0 | 1 | 1 | 1 | 42 psi |
| 1 | 0 | 0 | 0 | 48 psi |
| 1 | 0 | 0 | 1 | 54 psi |
| 1 | 0 | 1 | 0 | 60 psi |
| 1 | 0 | 1 | 1 | 66 psi |
| 1 | 1 | 0 | 0 | 72 psi |
| 1 | 1 | 0 | 1 | 78 psi |
| 1 | 1 | 1 | 0 | 84 psi |
| 1 | 1 | 1 | 1 | 90 psi |

Master controller inputs Nxx:i05 and Nxx:i06 "on" are used to indicate the pressure output of the proportional pressure regulator 69 or the equalizer pressure regulator 25 is within a +/−2% accuracy of the intended pressure determined by the bit sequence of Nxx:o13–16 or Nxx:o19–22. The weld pressure command will only operate when the tip close and weld position is executed. The master controller has full control of equalizer pressure and must alter pressure values as necessary by gun orientation.

Master controller outputs Nxx:o17 and Nxx:o18 are used to manually operate the weld gun. Output Nxx:o17 will jog the cylinder to a tip closed position and output Nxx:o18 will jog the cylinder to a tip open position. These features allow for manual extension and retraction from the master controller.

master controller inputs Nxx:i01–07 receives signals from the subcontroller 88 indicating various operating parameters of the weld gun. Input Nxx:i01 "on" indicates to the master controller that the system is on and no fault condition exists. Input Nxx:i02 "on" indicates that a forward/retract position has been achieved. Input Nxx:i03 "on" indicates that the weld stack is within permissible tolerance while "off" indicates that the stack is too thick or something is interfering with the tip travel. Input Nxx:i04 "on" indicates to the master controller the position over travel or a "pulled cap" condition. Input Nxx:i05 "on" indicates the commanded weld pressure is achieved as selected by outputs Nxx:o13–16. Input Nxx:o06 "on" indicates that the commanded equalizer pressure is achieved as selected by outputs Nxx:o19–22. Finally, input Nxx:i07 "on" indicates that the system is in calibration mode whereas "off" indicates calibration is complete and normal operation may resume.

After initialization and calibration is complete, operation of the weld gun system according to the present invention may be illustrated by the following steps:
1. Set bits Nxx:o04–Nxx:o07 for an intended position.
2. Hold bit Nx:o03 high to extend to the position.
3. Set bits Nxx:o13–Nxx:o16 for the desired pressure.
4. Set bits Nxx:o08–Nxx:o01 for the desired metal thickness.
5. Hold bit Nxx:o01 high to execute weld.
6. Test for bit Nxx:i03 for "positioned to weld".
7. Test for bit Nxx:i06 for weld pressure achieved.
8. Test for bit Nxx:i04, pulled cap, is not on.
9. Execute weld with weld controlled.
10. Drop bit Nxx:o01 to back up to location as sequenced by bits Nxx:o04–Nxx:o07 and set by Nxx:o03.
11. Drop bit Nxx:o03.
12. Enter new backup location steps 1 through 2.
13. Set new weld pressure Step 3.
14. Sent new thickness Step 4.
15. Execute weld sequence Steps 5 through 9.
16. Execute retract Step 10 through 11.

It will be apparent to those of ordinary skill in the art that the tables provided above are merely for illustrative purposes. Naturally, depending upon the design parameters, the control program can be modified to meet a desired need.

The pneumatic cylinder 14 is thus provided with a position controller that commands a proportional flow control valve connected to one or both of the ports 68 of the bearing caps 58 and 60 to provide closed loop positioning control of the piston rod 64. This system is provided with freely programmable closed loop position and pressure control due to the internal positioning encoder 78 and the sub-controller 88. Additionally, the positioning system learns and compensates for any cylinder wear over time and allows for a tip-dampening feature.

While there has been described what is presently believed to be the preferred embodiments of the inventions, those skilled in the art will realize that various changes in modifications may be made to the invention without departing from the spirit of the invention and it is intended to claim all such changes and modifications must fall within the scope of the invention.

What is claimed is:

1. A method for controlling the position of a weld gun weld tip comprising the steps of:
   inputting weld tip position information to a controller, wherein the input position information comprises one of a plurality of binary bit position sequences such that each position sequence corresponds to a different discrete weld tip position;
   detecting weld tip position with a positioning encoder and sending a weld tip position signal from the positioning encoder to the controller;
   comparing the inputted position information to the position signal in the controller; and
   activating a control valve via an output control signal from the controller to operate a pneumatic cylinder to extend or retract the weld tip based on the comparison made in the controller.

2. The method as defined in claim 1, wherein the bit position sequence comprises four binary bits representing sixteen possible weld tip locations.

3. The method as defined in claim 2, further comprising the steps of:
   inputting one of a plurality of binary bit pressure sequences to a controller, each pressure sequence corresponding to a different pressure applied at the weld tip;
   detecting weld tip pressure with a pressure regulator and sending a weld tip pressure signal from the pressure regulator to the controller;
   comparing the inputted binary bit pressure sequence to the weld tip pressure signal in the controller; and
   activating the control valve via an output control signal from the controller to operate a pneumatic cylinder to increase or decrease pressure applied at the weld tip based on the comparison made in the controller between the pressure signal and the pressure sequence.

4. The method as defined in claim 3, further comprising the steps of:
   inputting one of a plurality of binary bit dampening sequences to a controller, each dampening sequence corresponding to a different weld tip dampening position relative to a fully extended tip position;
   detecting weld tip position relative to the fully extended tip position with the positioning encoder and sending a weld tip dampening signal from the positioning encoder to the controller;
   comparing the inputted binary bit dampening sequence to the dampening signal in the controller;
   activating the control valve via an output signal from the controller to operate a pneumatic cylinder to first extend the weld tip to a dampening position based on the comparison made in the controller between the dampening signal and the dampening sequence; and
   further activating the control valve of the pneumatic cylinder to further extend the weld tip from the dampening position to the fully extended position.

5. A programmable welding system comprising:
   a weld gun comprising a pneumatic cylinder including a piston rod having a welding electrode coupled thereto for extending and retracting the welding electrode, the pneumatic cylinder further including an internal positioning encoder for detecting the position of the welding electrode and generating a position signal; and
   a programmable controller electrically connected to the weld gun for receiving an input signal corresponding to a selected weld gun electrode position, the controller further receiving the position signal generated by the positioning encoder and comparing the input signal to the actual position signal and generating an output signal in response thereto and activating the pneumatic cylinder of the weld gun in response to the controller output signal to extend or retract the welding electrode, wherein the input signal is one of a plurality of binary bit sequences, each binary bit sequence corresponding to a different weld gun electrode position.

6. The programmable welding system as defined in claim 5, wherein the pneumatic cylinder further includes a proportional flow control valve electrically coupled to the controller for extending and retracting the welding electrode in response to the output signal from the controller.

7. The programmable welding system as defined in claim 6, wherein the pneumatic cylinder further includes a proportional pressure regulator electrically coupled to the controller for regulating the amount of pneumatic pressure in the pneumatic cylinder.

8. The programmable welding system as defined in claim 6, wherein the internal positioning encoder comprises a linear potentiometer.

9. A servo-pneumatic spot weld gun comprising:
   a weld gun base module;
   a pneumatic cylinder coupled to the base module and including a movable piston having a first welding electrode coupled to an outer end thereof for reciprocal movement from a first end of the cylinder;

an arm having a first end attached to the weld gun base module and a second end having a second welding electrode coupled thereto, the second welding electrode being axially aligned and facing the first welding electrode with a gap defined therebetween; and a programmable controller operatively coupled to the pneumatic cylinder for controlling the movement of the first welding electrode to a plurality of programmable discrete increments for a portion of the pneumatic cylinder stroke distance.

10. The servo-pneumatic spot weld gun as defined in claim 1, further comprising a proportional flow control valve coupled to the pneumatic cylinder for movement of said piston, the proportional flow control valve being activated by the programmable controller.

11. The servo-pneumatic spot weld gun as defined in claim 1, wherein the pneumatic cylinder includes an internal positioning encoder for detecting piston position and transmitting piston position information to the programmable controller to control movement of the piston.

12. The servo-pneumatic spot weld gun as defined in claim 11, wherein the internal positioning encoder is a linear potentiometer.

13. The servo-pneumatic spot weld gun as defined in claim 1, wherein the weld gun base module is adapted for releasable attachment of the pneumatic cylinder and the arm, whereby the pneumatic cylinder and the arm may be interchanged with other pneumatic cylinders and arms.

14. The servo-pneumatic spot weld gun as defined in claim 1, wherein the weld gun base module is made from high strength machined aluminum.

15. The servo-pneumatic spot weld gun as defined in claim 10, wherein the proportional flow control valve is adjustable to deliver pressures in the range of 250 lbs. to 1610 lbs. between the welding electrodes.

16. The servo-pneumatic spot weld gun as defined in claim 1, wherein the pneumatic cylinder has a stroke distance of about 185 mm and an internal bore of about 125 mm.

17. The servo-pneumatic spot weld gun as defined in claim 1, wherein the pneumatic cylinder further comprises a scraper ring fixed in the first end of the cylinder, the scraper ring circumferentially contacting the cylinder piston to remove debris from the piston as the piston reciprocates.

18. The servo-pneumatic spot weld gun as defined in claim 1, wherein the programmable controller further controls weld pressure applied between the first and second welding electrodes.

* * * * *

UNITED STATES PATENT AND TRADEMARK OFFICE
CERTIFICATE OF CORRECTION

PATENT NO.     : 6,455,800 B1
DATED          : September 24, 2002
INVENTOR(S)    : Jansens et al.

It is certified that error appears in the above-identified patent and that said Letters Patent is hereby corrected as shown below:

Column 11,
Lines 13-14, 18-19 and 26-27, "The servo-pneumatic spot weld gun as defined in Claim 1," should read -- The servo-pneumatic spot weld gun as defined in Claim 9, --

Column 12,
Lines 5-6, 12-13, 16-17 and 22-23, "The servo-pneumatic spot weld gun as defined in Claim 1," should read -- The servo-pneumatic spot weld gun as defined in Claim 9, --

Signed and Sealed this

Second Day of September, 2003

JAMES E. ROGAN
*Director of the United States Patent and Trademark Office*